United States Patent

[11] 3,572,030

[72] Inventor James D. Cuff
    2632 Valleybrook Drive N.E., Huntsville, Ala. 35811
[21] Appl. No. 787,053
[22] Filed Dec. 26, 1968
[45] Patented Mar. 23, 1971

[54] ROTARY ENGINE ASSEMBLY
     3 Claims, 4 Drawing Figs.

[52] U.S. Cl. ................................................. 60/39.61,
                              418/125, 418/266, 123/145
[51] Int. Cl. ...................................................... F02c 3/00
[50] Field of Search ........................................... 123/16, 191
        (S) (SP); 60/39.61, 39.62; 418/125, 266; 123/145

[56] References Cited
    UNITED STATES PATENTS
    813,018   2/1906   Okun.............................. 123/16

| | | | |
|---|---|---|---|
| 939,751 | 11/1909 | Schulz.......................... | 60/39.62(X) |
| 1,427,053 | 8/1922 | Bidwell......................... | 60/39.61 |
| 1,637,958 | 8/1927 | Newson......................... | 60/39.61 |
| 2,506,768 | 5/1950 | Bentz et al. .................. | 123/145(A)(X) |
| 2,632,300 | 3/1953 | Brzozowski ................... | 60/39.82(I)(X) |
| 3,227,145 | 1/1966 | Bernard......................... | 123/8(JJ)(UX) |

FOREIGN PATENTS

| 473,371 | 9/1914 | France ......................... | 60/39.61 |
| 4,914 | 3/1899 | Great Britain................ | 60/39.61 |

Primary Examiner—Allan D. Herrmann
Attorney—C. A. Phillips

ABSTRACT: A rotary internal combustion engine having a combustion chamber or chambers located exterior to the compression and expansion areas of the engine.

James D. Cuff,
INVENTOR

James D. Cuff,
INVENTOR

ROTARY ENGINE ASSEMBLY

This invention relates to an improved rotary internal combustion engine utilizing a combustion chamber or chambers located exterior to the compression and expansion areas of the outer wall and, broadly stated, the invention comprises the following features and advantages:

1. A combustion chamber or chambers exterior to the compression and expansion chambers;
2. A greater volume expansion region than compression region to achieve greatest thermal efficiency;
3. Forced expulsion of exhaust gases to achieve greater volumetric efficiency;
4. A power valving system that does not require the power valve to be completely seated to provide adequate sealing; and
5. An auxiliary ignition mechanism to assure complete combustion of the air-fuel mixture.

An engine constructed in accordance with this invention consists of an outer wall surface divided into four distinct working areas and two wiper areas. The four working areas of the outer wall are the intake area, compression area, power area and exhaust area. The outer wall is a complex geometric shape whose power or expansion area will be larger than the compression area. An alternate method is to have the outer wall approximately symmetrical, with the expansion area equal to the compression area. The outer wall will conform to the shape of the rotor only in the area of the wipers, which provide a sealing area between the rotor and outer walls. An alternate method is to have a positive pressure seal in the wiper area between the compression and power ports, and reducing the flow of gas between the exhaust and intake ports by reducing the clearance between the rotor and outer wall. The inlet, exhaust, compression and power ports will be located in the outer wall. An alternate method is to locate the ports in the end plate wall. The rotor fits concentrically within the outer wall. The rotor is cylindrical in shape, with a drive shaft keyed or splined to the rotor. An alternate method is to have the drive shaft an integral part of the rotor. The rotor contains one or more vanes that move in slots in the rotor and that are actuated by springs to always be in contact with the outer wall. An alternate method of maintaining the vanes in contact with the outer wall is to use hydraulic or pneumatic pressure at the base of the vanes. Centrifugal force will maintain the vanes in contact with the outer wall after the engine has attained running speed. The vanes are rectangular in shape and the inner surface of the outer wall is flat. An alternate method is to have semicircular-shaped vanes fit in a semicircular-shaped outer wall inner surface. The sides of the vanes and the rotor that face the end plates require sealing strips actuated by spring action to provide adequate sealing. An alternate method is to machine the ends of the rotor and vanes to fit exactly within the end plates to provide a rotating seal. Cutouts are provided in the rotor next to the back side of the vanes to provide more area in contact with the expanding gas. An alternate method is to have the rotor with no cutouts.

End plates attach to the ends of the outer wall and provide a seal on each end of the rotor and outer wall. The end plates also support the bearings for the drive shaft. Gaskets are required between the end plates and the ends of the outer wall for sealing. An alternate method is to machine the end of the outer wall and end plates so that no gasket is required. Another method would be to have one end plate an integral part of the outer wall assembly.

Combustion chambers are attached to the engine in such a manner that each combustion chamber is connected to a compression port and an exhaust port. Two combustion chambers are required for a 3-vane engine. Any engine designed with two or more vanes will require at least two combustion chambers. Any engine designed with one vane will require only one combustion chamber. Each combustion chamber must have at least two valves, an inlet valve and a power valve. Each combustion chamber of the spark ignition version must contain a spark plug or spark producing device. If the engine is designed as a compression ignition-type the combustion chamber must contain a fuel injector. A plenum chamber with a check-type valve is located between the compression port on the outer wall and the inlet valve of the combustion chamber. This plenum chamber is to store compressed gas between compression cycles. An alternate method is to locate the inlet valves in the outer wall in such a manner as to have the combustion chamber accept directly the compressed gas.

A glow wire or glow plug is installed within the power port of the outer wall. This glow device is the auxiliary ignition source. It could be the primary ignition source on engines where no ignition device or fuel injector was installed in the combustion chamber, and would be the auxiliary combustion device in all other cases. This device provides for more complete combustion of the air-fuel mixture. The engine requires a carburetor-type device to provide the correct air-fuel mixture to the intake port in the case of a spark ignition version, and air only is required at the intake port in the case of the compression ignition engine. Conventional auxiliary equipment, including a complete ignition system in the case of the spark ignition engine or fuel injection system in the case of the compression ignition engine, a lubrication system and a cooling system are required to operate the engine. The details of the lubricating and cooling systems are not shown. An internal lubricating system may be achieved by metering the lubricant into the inlet port of the engine or mixing it with the fuel. Engines may be combined in series to make a larger engine, or a single engine may be lengthened and additional combustion chambers added along its length to increase its power.

The invention will now be described in conjunction with the accompanying drawings wherein like parts are represented by like numerals and in which.

Figure 2:
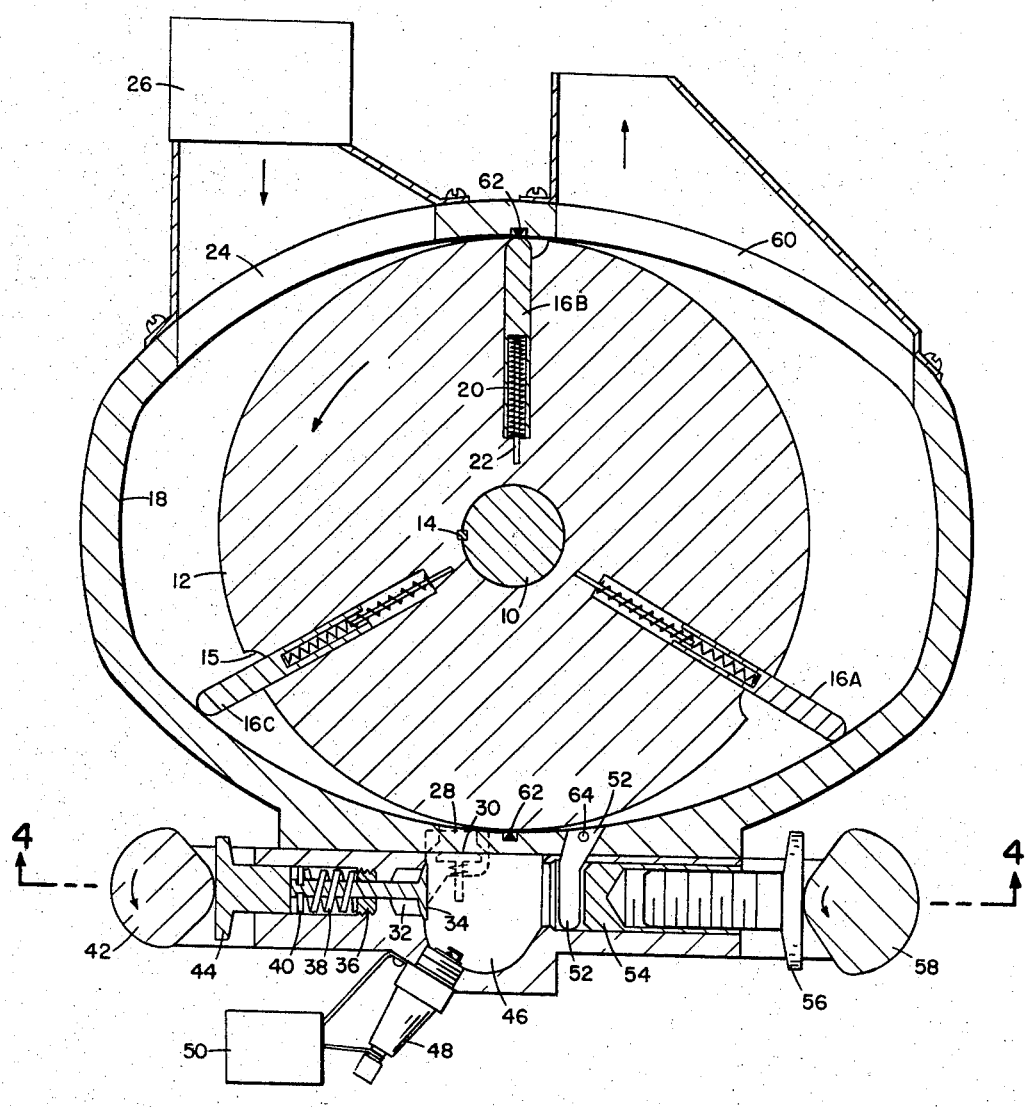
FIG. 2 is a front view of an engine, sectioned along line 2—2 of FIG. 1.

Referring now to FIG. 2, there is shown a sectional front view of an engine. The engine consists of a drive shaft 10, which may be an integral part of the rotor 12, but the preferred method of attachment is by a key 14. Cutouts 15 in the rotor provide a larger area for the expanding gas to act on. An alternate method is to eliminate the cutouts 15. The rotor 12 contains three vanes 16, labeled A, B, and C, which are mounted in slots in the rotor 12, and which are kept in contact with the outer wall 18 at all times by means of springs 20. Alternate methods of maintaining the vanes 16 in contact with the outer wall 18 could by hydraulic or pneumatic pressure at the base of the vanes 16. Vane spring guides 22 are used to assure that the springs 20 do not buckle. An intake port 24 allows the air-fuel mixture to pass from the carburetor 26 to within the outer wall 18. In the case of a compression ignition engine (FIG. 3), no carburetor 26 is used and only air enters through the intake port 24. A compression port 28 is located near the bottom of the outer wall 18 compression area. Located within the compression port 28 is a plenum valve 30. The plenum valve is a poppet-type valve that will open during flow in one direction and close to prevent reverse flow. An alternate method is to use any type of valve that will allow flow in one direction only. A plenum chamber 32 is used to store compressed gas, and is an interconnecting chamber between the inlet sides of the inlet valve 34 and the compression port 28. The inlet valve 34 will open or be forced open for flow in one direction and be closed to hold pressure. A stem-type inlet valve 34 is used. An alternate method is to use any type of actuated or poppet inlet valve 34. A close tolerance pressure seal 36 prevents pressure from escaping along the valve stem. The inlet valve 34 has a closing spring 38 that exerts force on the closing spring retainer 40 to force the valve 34 to the closed position. An inlet valve cam 42 driven by drive shaft 10 through means not shown, rotates to operate the inlet valve lifter 44, which forces the inlet valve 34 to open. The combustion chamber 46 is designed in proportion to the compression stroke, to achieve the correct compression ratio. The combustion chamber 46 of a spark ignition engine must contain a spark plug 48 or spark producing device. A spark generating system 50 coupled to the engine by means not shown, provides a high voltage at the correct time to power the spark plug 48 to produce ignition. A power port 52 extends from the combustion chamber 46 into the outer wall 18 power area. A power valve 54 is used to block the power port 52 until flow is needed. The power valve 54 is connected to a power valve lifter 56 and actuated by a power valve cam 58 driven by drive shaft 10 through means not shown, which operates the power valve 54 to close the power port 52. High pressure from combustion within the combustion chamber 46 exerts force on the power valve 54 face to force it open, providing communication between the combustion chamber 46 and the outer wall 18 power area when the power valve cam 58 is rotated to its least dimension. The power valve 54 need not be forced completely into its valve seat to effect a seal as the power port 52 is a small distance from the valve seat, and the power valve 54 body is sufficient to cover and seal the port without the valve 54 being completely seated. An alternate method is to use any type of actuated power valve 54. Two combustion chambers 46 along with associated inlet valves 34, power valves 54 and spark plugs 48 are required for each spark ignition engine with two or more vanes 16. An exhaust port 60 allows the exhaust gas to pass from the outer wall 18 power area to the atmosphere. A wiper 62 is provided at the top and bottom of the outer wall 18. A spring-actuated wiper 62 is used. The wiper acts as a seal between the outer wall 18 and the rotor 12. The outer wall 18 is also machined to conform to the rotor 12 on both sides of the wiper 62. An alternate method is to machine the outer wall 18 to conform exactly to the rotor 12, in the area of contact such that the rotor 12 and outer wall 18 mate and provide a rotating seal in the wiper 62 areas. An alternate method to having a wiper 62 in the area between the inlet port 24 and the exhaust port 60 is to reduce the flow between these ports without having a positive seal. This method will reduce the volumetric efficiency of the engine but will eliminate any close tolerance fit between the rotor 12 and the outer wall 18. A glow device 64 attached to a power source not shown, is used in the power port 52 as an auxiliary ignition source to provide complete combustion of the gases as they pass through the power port 52. The glow device 64 may be a high resistance wire connected to any electrical source. An alternate method is to use a glow plug.

Figure 3:
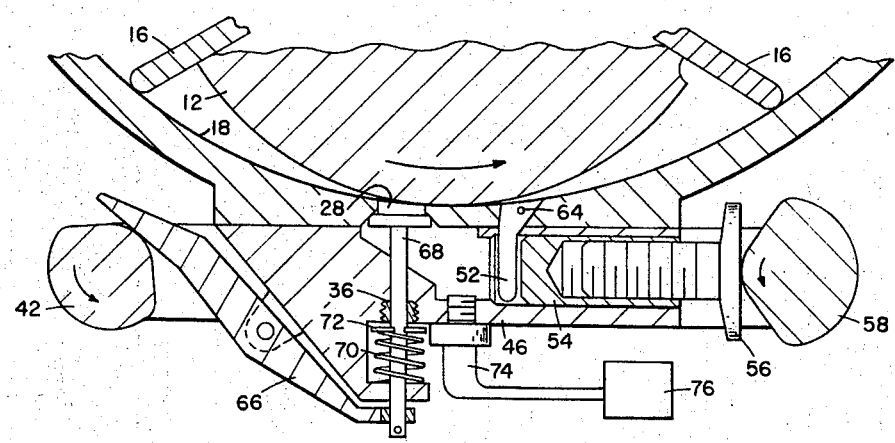
FIG. 3 is a partial section view taken along lines 2—2 of FIG. 1 and in addition showing a combustion chamber of a compression ignition engine.

Reference will now be made to FIG. 3 for a description of an alternate valving system that may be used on a spark ignition engine or on a compression ignition engine. This valving arrangement eliminates the need for a plenum chamber 32 and plenum valve 30. In this arrangement a rocker arm 66 is operated by the inlet valve cam 42 driven by drive shaft 10 through means not shown to lift the inlet valve 68 by the pin in the stem. A closing spring 70 exerting force on the closing spring retainer 72 forces the inlet valve 68 to seat, closing the compression port 28. The compressed gas passes directly from the outer wall 18 compression area, through the compression port 28 and into the combustion chamber 46. A fuel injector nozzle 74 is used on the compression ignition engine to inject fuel form the fuel pump 76 driven by drive shaft 10 through means not shown into the combustion chamber 46. The wipers 62 are eliminated in this FIG. to illustrate how the rotor 12 can conform to the outer wall 18 to provide a rotating seal. The power valving 54 system in this FIG. is identical to that in FIG. 2.

Figure 1:
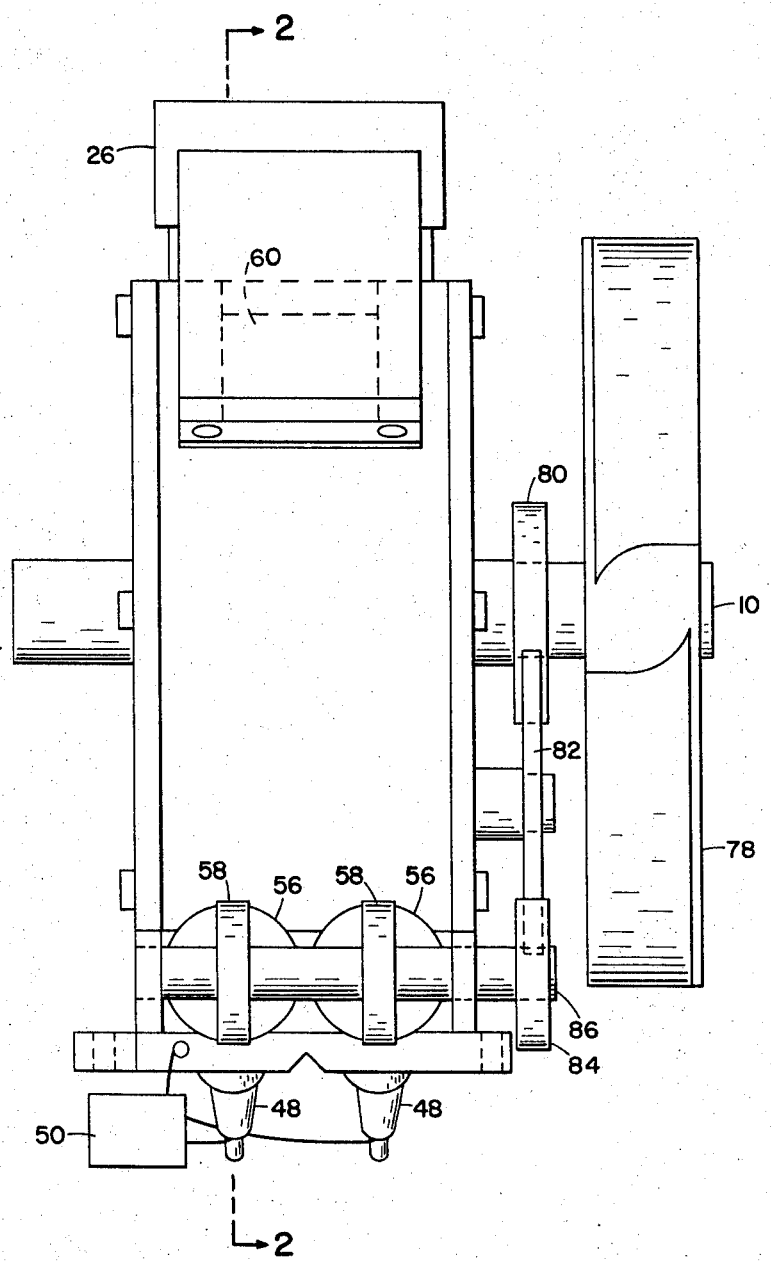
FIG. 1 is a side view of an engine, constructed in accordance with the invention.

Reference will now be made to FIG. 1 for a further description of the engine. A fan 78 is shown attached to the drive shaft 10 for cooling. An alternate method is to incorporate a water jacket into the outer wall 18 and combustion chamber 46 wills for water or chemical cooling. The power valve cam 58 is driven from the drive shaft 10 through a main drive gear 80, idler gear 82, and camshaft gear 84. Any conventional gearing method may be used to drive the camshaft gear 84.

Figure 4:
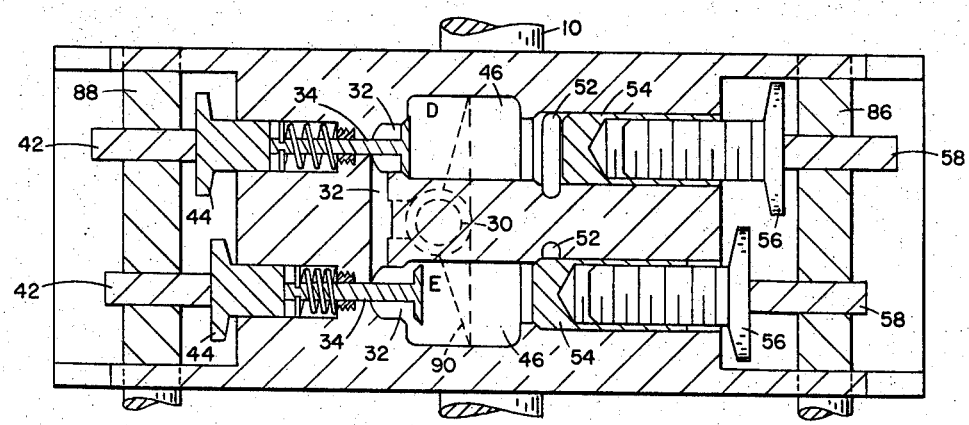
FIG. 4 a bottom view of the combustion chambers, sectioned along line 4—4 of FIG. 2.

Reference will now be made to FIGS. 2 and 4 for details of the combustion chambers 46. The combustion chambers 46 are arranged to produce power pulses alternately. FIG. 4 shows the details of the power valve camshaft 86 and inlet valve camshafts 88 rotated to the position to have combustion chamber 46D in a power cycle with power valve 54 open, and combustion chamber 46E in a compression cycle with inlet valve 34 open. A slight indentation is shown in the outer wall 18. This is a collector groove 90 that channels the compressed gas into the compression port 28.

Considering now the operation of a rotary spark ignition engine and referring to FIGS. 2 and 4, it will be seen that as the rotor 12 rotates in a counterclockwise direction it is being forced to rotate by the expanding combustion products from combustion chamber 46D flowing through the power port 52 and acting on the rearward side of vane 16A. Vane 16C is compressing air-fuel mixture ahead of it, through the compression port 28, plenum valve 30 and plenum chamber 32, and through open inlet valve 34 into combustion chamber 46E. The power valve 54 on combustion chamber 46E is held closed by power valve cam 58, maintaining pressure in the combustion chamber 46. Vane 16C is creating a partial vacuum on its rearward side, and drawing an air-fuel mixture through the intake port 24 and into the outer wall 18 intake area. Exhaust gas is being forced out the exhaust port 60 by the forward face of vane 16A. Wiper 62 prevents the exhaust gas from passing from the exhaust area to the intake area.

Consider now the rotor to have rotated 60° counterclockwise. Vane 16A is over exhaust port 60 and allowing the forcing gasses from the rearward side to exit out the exhaust port 60. Vane 16B has almost cleared the intake port 24 and will be compressing air-fuel mixture ahead of it and drawing air-fuel mixture through the intake port 24 behind it. Vane 16C has completed compressing the gases ahead of it through the compression port 28, through the plenum chamber 32 and inlet valve 34 into combustion chamber 46E. The inlet valve 34 closes when vane 16C reaches the opening of the compression port 28. The plenum valve 30 closes when the pressure within the plenum chamber 32 equals or exceeds the pressure in the outer wall 18 compression area. The compressed gas is trapped in combustion chamber 46E by the closed inlet valve 34 and power valve 54. The compressed gas in combustion chamber 46E will be ignited by spark plug 48. Combustion chamber 46D is still communicating through power port 52 with the exhaust port 60, but is in the process of having power valve 54 close off the power port 52 and inlet valve 34 is starting to open.

Consider the rotor to have rotated 120° counterclockwise from the position shown in FIG. 2. Vane 16A has forced the exhaust gas ahead of it through exhaust port 60 and the exhaust gas following vane 16A is exiting through the exhaust port 60. Vane 16B is compressing air-fuel mixture ahead of it port 28, open plenum valve 30, plenum chamber 32 and through open inlet valve 34 into combustion chamber 46D. The power valve 54 is held in the closed position by power valve cam 58 acting on power valve lifter 56. The back side of vane 16B is creating a partial vacuum and causing air-fuel mixture to flow into the outer wall 18 intake area through the intake port 24. Combustion has occurred in combustion chamber 46E due to a spark from the spark plug 48, and the expanding gasses are flowing through power port 52 to the outer wall 18 power area, exerting force on the back side of vane 16C, causing the rotor 12 to rotate. The expanding gas is further ignited while passing through power port 52 by passing around the glow device 64. The inlet valve 34 on combustion chamber 46E is held in the closed position by closing spring 38.

Consider the rotor to have rotated 180° counterclockwise from the position shown in FIG. 1. Vane 16A is about to clear the intake port 24 and will start compressing the air-fuel mixture ahead of it, and drawing in air-fuel mixture behind it. Vane 16B has completed compressing into combustion chamber 46D through the compression port 28, plenum valve 30, plenum chamber 32 and by open inlet valve 34. Combustion chamber 46D is now maintaining the pressure by having the inlet valve 34 and power valve 54 in the closed position. Spark plug 48 will be fired by spark generating system 50 causing combustion and an increase in combustion chamber 46D pressure. Vane 16C has forced exhaust gasses ahead of it through exhaust port 60 and is allowing the forcing gases behind it to also pass through exhaust port 60. The power valve 54 on combustion chamber 46E is being forced closed by power valve cam 58 acting on power valve lifter 56 and the inlet valve 34 is being forced open by inlet valve cam 42 acting on inlet valve lifter 44.

Consider the rotor to have rotated 240° counter clockwise from the position shown in FIG. 2. The valve arrangement will again be exactly that shown in FIG. 4. Vane 16A will be compressing gas through compression port 28, plenum valve 30, plenum chamber 32 and past open inlet valve 34 into combustion chamber 46E. Power valve 54 on combustion chamber 46E will be closed and maintained in the closed position by power valve cam 58 acting through power valve lifter 56. Vane 16B will be forced to rotate by the expanding gas acting on its backside. The expanding gas will be communicating from combustion chamber 46D through the open power port 52. The expanding gas will be further ignited by passing around glow device 64. Vane 16B will be forcing exhaust gas ahead of it out the exhaust port 60. Vane 16C will have completed expelling the exhaust gasses ahead of it through exhaust port 60 and will be ready to start the intake cycle.

It should be noted from the foregoing that for an engine with two or more vanes 16 an alternate combustion chamber 46 delivers a power cycle each time a vane 16 completes a compression cycle. For a 3-vane 16 engine, three power cycles are delivered for each 360° revolution of the rotor 12.

A compression ignition engine would operate like the spark ignition engine described, except that air only would be caused to flow through the intake port 24, and instead of the spark plug 48 causing ignition, fuel would be injected into the combustion chamber 46 through the fuel injection nozzle 74 to cause combustion.

The alternate valve arrangement shown in FIG. 3 would operate in the same manner as already described, except that the compressed gas would flow directly from the outer wall 18 compression area, through the compression port 28, past the open inlet valve 68 and into the combustion chamber 46. The compressed gas would not have to pass through a plenum valve 30 or plenum chamber 32 prior to entering the combustion chamber 46.

A 1-vane 16 engine would require only one combustion chamber 46 and associated inlet valve 34 system and power valve 54 system for operation. The 1-vane 16 engine would produce only one power cycle per revolution.

An engine may contain numerous vanes 16 and only two combustion chambers 46 would be required. The combustion chambers 46 would produce power pulses alternately as previously described.

The invention includes an engine with one or more vanes 16 and one or more combustion chambers 46. Each combustion chamber 46 must be capable of being isolated from the outer wall 18 compression and power areas by some inlet 34 and power valving 54 arrangement.

I claim:
1. A rotary engine assembly comprising:
A. a housing, the walls of which comprise an enclosure and of which two dimensions generally define an oval plane;
B. a rotor having a generally cylindrical outer surface positioned for rotation within said housing about an axis perpendicular to said plane and dividing said enclosure into first and second chambers, said second chamber being of greater volume that said first chamber;
C. two or more radial vanes movably supported by said rotor and forming with a varying portion of said first chamber a compression region as said vane is rotated by said rotor through said first chamber and said vane forming with a variable portion of said second chamber an expansion region as said vane is rotated through said second chamber by said rotor;
D. said rotor including cutout regions adjacent to position of said vanes exposing the expanding gases to a larger area of said vanes;
E. means for storing and restricting the gas flow between said first and second chambers in a first region between said first and second chambers in a plenum chamber;
F. sealing means in engagement with a portion of the outer surface of said rotor for providing a pressure sealing barrier in a second region between said first and second chambers and wherein said second region is spaced from said first region;
G. a gas intake port for admitting gas to said first chamber and a gas exhaust port for exhausting gas from said second chamber, said gas intake port and gas exhaust port being openings in said first and second chambers, respectively, adjacent to and on opposite sides of said first region;
H. at least two combustion chambers, said combustion chambers being external to said enclosure;
I. an inlet valve assembly coupled to each said combustion chamber and including an inlet passageway connecting a portion of said first chamber adjacent to said pressure sealing barrier and said combustion chamber and including means for opening and closing said inlet passageway;
J. a power valve assembly coupled to each said combustion chamber and including a power passageway connecting a portion of said second chamber which is adjacent to said pressure sealing barrier and said combustion chamber and including means for opening and closing said power passageway; and
L. valve assembly operating means comprising means responsive to the rotation of vanes during a period of rotor rotation for operating said inlet and power valve assemblies coupled to said combustion chambers:
 1. operating open said inlet passageway when said vane rotates from said gas intake of said first chamber to said inlet passageway;
 2. closing said inlet passageway when said vane reaches said inlet passageway;
 3. operating open said power passageway when said vane passes said power passageway; and
 4. closing said power passageway when said vane reaches said gas exhaust port.

2. A rotary engine assembly as set forth in claim 1 further comprising fuel injection means for injecting fuel under pressure to each said combustion chamber during a portion of travel of said rotor when said inlet and power valves are seated and compressed air is contained in a said combustion chamber at high temperature, whereby said fuel injected into said combustion chamber is ignited by high temperature compressed air.

3. A rotary engine assembly as set forth in claim 1, further comprising an electrically heated glow surface positioned in said power passageway for enhancing combustion.